Figure 1:
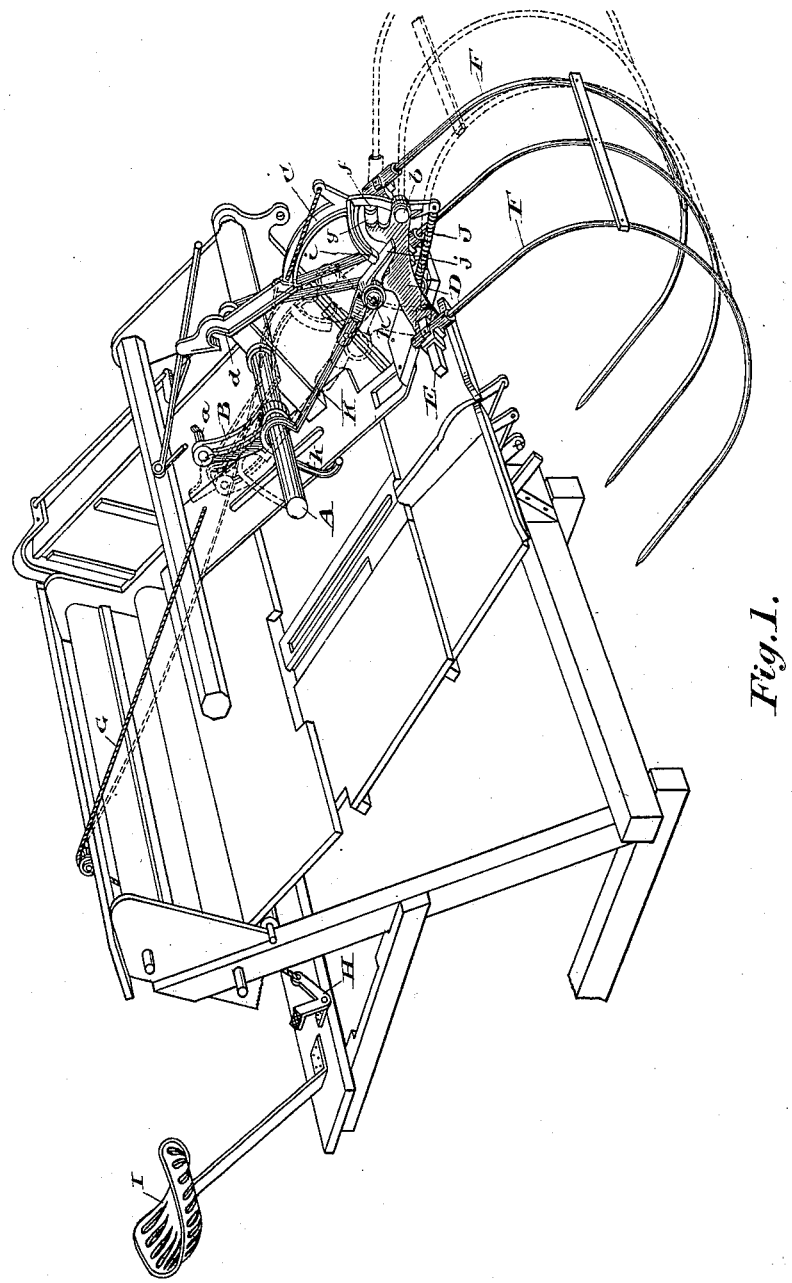

(No Model.) 2 Sheets—Sheet 1.

J. HARRIS & J. LUCAS.
MECHANISM FOR DUMPING THE BUNDLE CARRIERS OF HARVESTING MACHINES.

No. 322,932. Patented July 28, 1885.

Witnesses.
J. B. Fetherstonhaugh
Charles C. Baldwin

Inventor:
John Harris
Josiah Lucas
by Donald C. Ridout & Co
Attys

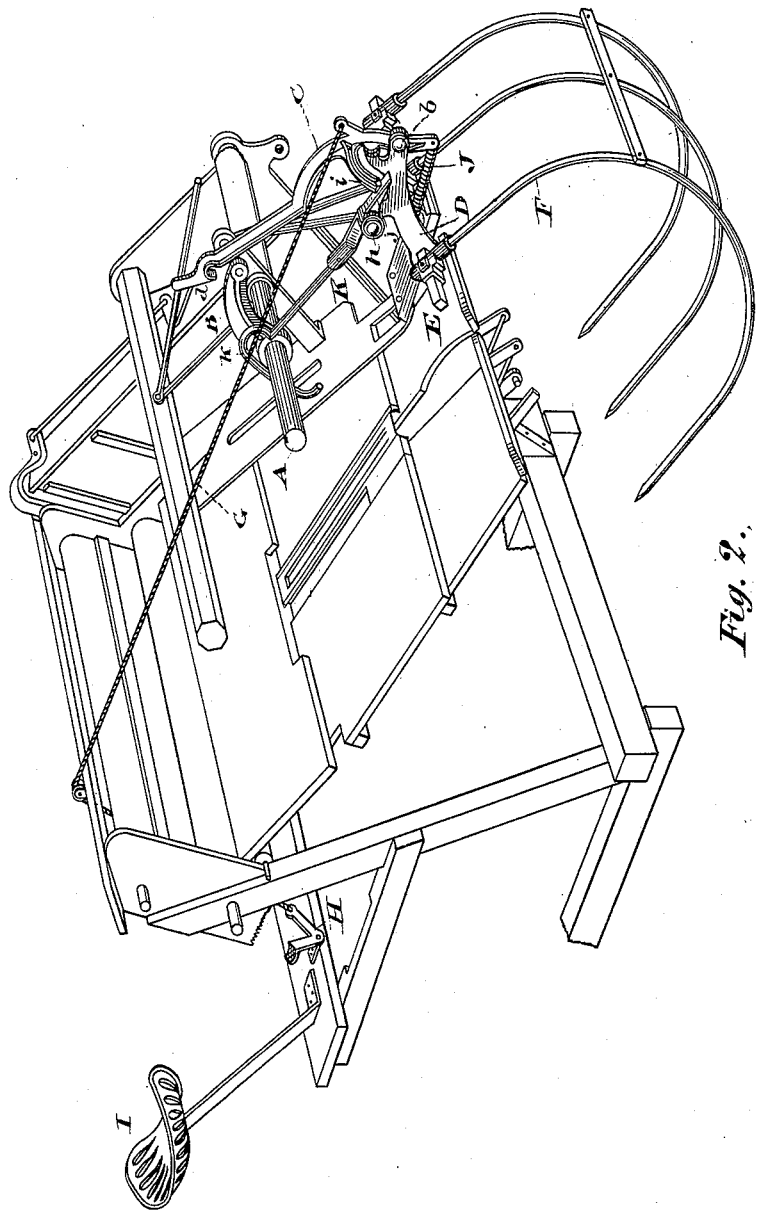

UNITED STATES PATENT OFFICE.

JOHN HARRIS AND JOSIAH LUCAS, OF BRANTFORD, ONTARIO, CANADA, ASSIGNORS TO A. HARRIS, SON & CO., (LIMITED,) OF SAME PLACE.

MECHANISM FOR DUMPING THE BUNDLE-CARRIERS OF HARVESTING-MACHINES.

SPECIFICATION forming part of Letters Patent No. 322,932, dated July 28, 1885.

Application filed February 24, 1885. (No model.) Patented in Canada March 14, 1885, No. 21,258.

*To all whom it may concern:*

Be it known that we, JOHN HARRIS, of the city of Brantford, in the county of Brant, in the Province of Ontario, Canada, manufacturer, and JOSIAH LUCAS, of the same place, mechanic, have jointly invented a new and useful Improvement in Mechanism for Dumping the Bundle-Carriers of Harvester-Binders; and we do hereby declare that the following is a full, clear, and exact description of the same.

The object of the invention is to arrange simple mechanism whereby the revolving motion of the knotter-shaft may be utilized for the purpose of dumping the bundle-carrier; and it consists, essentially, of a hooked arm pivotally connected to the bundle-carrier, and so arranged that the driver can readily bring its hooked end within range of a crank-arm connected to the knotter-shaft, and arranged to connect with the hooked arm, substantially as hereinafter more particularly explained.

Figure 1 is a perspective skeleton view, showing the position of the parts before the pivoted hooked arm is brought within range of the crank-arm on the knotter-shaft. Fig. 2 is a perspective skeleton view showing the position of the parts when the pivoted arm is brought within range of the crank-arm on the knotter-shaft.

A is the knotter-shaft.

B is a crank-arm keyed to the knotter-shaft A, and having a pin, $a$, on its outer end, as shown.

C is an arm pivoted at $b$ to the bracket D, which is fixed to the toothed bar E, which carries the teeth F, forming the bundle-carrier. A hook, $d$, is formed on the end of the arm C.

G is a rope connected at one end to the arm C, and at its other end to the foot-lever H, which is within easy reach of the foot of the driver when on the seat I.

J is a spring designed to hold the arm C so that its hooked end $d$ shall be clear of the pin $a$ on the crank-arm B. When in this position the stop $f$ on the arm C is clear of the stop $g$ on the bracket D.

When the driver desires to dump the bundle-carrier, he presses his foot upon the foot-lever H, so as to push it from him, which will depress the long arm of said lever and cause it to draw upon the rope G until the stop $f$ is brought in contact with the stop $g$ on the bracket D, by which time the hook $d$ is brought within range of the pin $a$ on the crank-arm B. This position is indicated in Fig. 2, where the pin $a$ is about to enter the hook $d$. The moment the pin $a$ enters the hook $d$ the connection is formed between the bundle-carrier and knotter-shaft, which in revolving will of course cause the bundle-carrier to dump. By the time that the crank-arm B has traveled to the position shown in dotted lines in Fig. 1, the bottom side of the arm C has come in contact with the knotter-shaft A, when of course the pin $a$ must leave the hook $d$, and thus the connection between the knotter-shaft and bundle-carrier is broken, and the bundle-carrier is allowed to fall into its initial position.

With the view of locking the bundle-carrier in order to prevent it being dumped by the weight of the bundles, we pivot on the bracket D at $h$ an arm, K, which has a hooked end, $k$, designed to fit over the knotter-shaft A. When the arm K is in the position it is indicated in in Fig. 1, the hooked end $k$ fits over the knotter-shaft A, as stated, thereby forming a complete lock to prevent the bundle-carrier from moving until the said hooked end $k$ has been raised clear of the knotter-shaft A. This motion is effected by the projection $i$ on the arm C coming in contact with the tail $j$, formed on the end of the arm K, when the driver has brought the arm C within range of the pin $a$, as before stated. The projection $i$, when coming in contact with the tail $j$, tilts the arm K from the position it is indicated in in Fig. 1 to the position it is shown in in Fig. 2, raising the back of the hook $k$ clear of the knotter-shaft A. The arm K will then form no obstruction to the dumping of the bundle-carrier, as it merely slides on top of the knotter-shaft A. This will be understood on reference to Fig. 1, where the arm K is shown in dotted lines in the position named.

We are aware of the Patent No. 102,890, and make no claim to the construction shown therein as forming part of our invention.

What we claim as our invention is—

1. The hooked arm C, pivotally connected to the bundle-carrier, in combination with the knotter-shaft A and the crank-arm B, fixed to the knotter-shaft, and adapted to intermittently engage said hooked arm, substantially as and for the purpose specified.

2. The arm C, pivoted at $b$ to the bracket D and supported by the spring J, a hook, $d$, formed on the end of the arm C, and a rope, G, connected, respectively, to the arm C and foot-lever H, in combination with a crank-arm, B, fixed to the knotter-shaft A, the whole being arranged and operated substantially as and for the purpose specified.

3. The arm C, pivoted at $b$ to the bracket D, the stop $f$ on the arm C, and the stop $g$ on the bracket D, in combination with the rope G and arm B, the latter being arranged to engage with the hook $d$ on the arm C, substantially as and for the purpose specified.

4. The arm K, pivoted at $h$ to the bracket D, and having a long hooked end, $k$, to fit over the knotter-shaft A, and a tail, $j$, on the back side of the pivot $h$, in combination with the arm C, pivotally connected to the bundle-carrier and having formed thereon the projection $i$, substantially as and for the purpose specified.

Brantford, February 12, 1885.

JOHN HARRIS.
JOSIAH LUCAS.

In presence of—
   WILLIAM GREIG,
   JAMES GRANT.